Jan. 31, 1967  J. D. MAHONEY, JR  3,301,252

METHOD OF APPLYING A POLYURETHANE FOAM SPLINT

Filed Dec. 5, 1963

INVENTOR.
JAMES D. MAHONEY, JR
BY
ATTORNEYS.

United States Patent Office 3,301,252
Patented Jan. 31, 1967

3,301,252
METHOD OF APPLYING A POLYURETHANE FOAM SPLINT
James D. Mahoney, Jr., 139 Gateshead Drive, Canonsburg, Pa. 15317
Filed Dec. 5, 1963, Ser. No. 328,304
1 Claim. (Cl. 128—90)

This invention relates to splints or casts which are applied to the human body to secure and support it as, for example, in the case of a broken limb, and particularly to a novel method for applying these supports.

Previously, when strong and rigid support was required for a portion of the human body, the common material utilized was plaster of Paris. However, the many disadvantages of such a material in a splint or cast are commonly known and include the tremendous weight of such a cast, the lack of porosity which causes great discomfort to the patient, bulkiness, and in spite of its great density, a low cast strength.

Therefore, plastic casts have been suggested and in an effort to obviate the disadvantages of the plaster cast, several other disadvantages peculiar to this type of rigid dressing have been encountered. For example, in U.S. Patent 2,948,634, a rigid plastic dressing is disclosed which is apparently more expedient than the old plaster cast. That disclosed process involves the use of a dressing prepared by coating a textile material with methacrylate. The dressing, after being applied to the patient, is treated with an appropriate solvent to dissolve the plastic so that evaporation of the solvent results in the formation of a cohesive film thereby producing a rigid material. Although this method purports to be an inexpensive one, an apparent disadvantage lies in the fact that in order to make up the bandage which will later be made rigid on the body of the patient, a fairly expensive and elaborate process is involved requiring special machinery and no less than eight steps before the dressing is ready to perform its supportive function. In addition, such plastic dressings are not porous and do not allow the skin to "breathe." In the space of the six weeks or more for which a cast may be required, the discomfort due to the itchiness of the skin under these circumstances is of major consideration.

Therefore, foam splints have been suggested as suitable alternatives to overcome these disadvantages. In British Patent 762,897, a foam sheet is formed around the area to be supported or an impression of that area, and heated with a sheet of polyethylene to give it rigidity. However, it is apparent that such a support lacks the strength required for proper function on an area such as an arm or leg which is constantly subjected to forces detrimental to the proper healing of that area. Reinforcement of such a splint is therefore required. Any advantages are consequently effectively negated since the added weight of the reinforcing agent, the additional steps required for incorporating such a reinforcement, and the additional expense as well as the added discomfort to the patient sufficiently cancels any advantages this mode of cast or splint may have had.

A method for forming a rigid polyurethane foam in place, on a patient's wrist, for example, is described in U.S. Patent 2,947,307. However, there is the problem of an exotherm which is of sufficient magnitude to boil water in many cases, and which presents a difficulty in adapting the polyurethane foams to this application. In addition, the diisocyanates disclosed for use in the patented process are toxic and harmful to the operator who consistently works with that foam, and to the patient to whom the foam is applied.

It is, therefore, an object of the present invention to provide a method for applying a splint to the body to secure and support it, which is devoid of the foregoing disadvantages. It is a further object of this invention to provide a polyurethane foam formulation which is particularly adaptable to the present purpose, and devoid of the foregoing disadvantages. Further, it is an object of this invention to provide a method for applying the splint or cast which is easy, efficient, economical and avoids subjecting the patient to excessively toxic fumes. A still further object of this invention is to provide a splint which is light and strong, and which acts as a buffer for the area being supported so that in case that area is dealt a blow, the splint will effectively absorb the shock and the supported area will be essentially completely shielded from it.

Other objects will become apparent from the following description with reference to the accompanying drawings in which.

Figure 1:
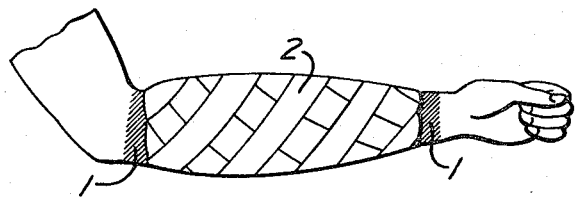
FIGURE 1 shows, in one embodiment of this invention, an arm requiring support on which a lubricant has been applied and which has thereafter been wrapped with gauze.

The foregoing objects are accomplished in accordance with the present invention, generally speaking, by applying a cast or splint to support the human body, by a process wherein a novel liquid foamable composition is sprayed on the area to be supported and the non-toxic polyurethane foam formulation then reacts to form a solidified foam splint without developing a high exotherm.

This invention enables one to spray a foamable polyurethane composition without toxicity problems ordinarily encountered when such compositions are sprayed. Because it uses as the polyisocyanate one which is of a relatively low volatility such as a polyaryl alkylene polyisocyanate and particularly a mixture of 4,4'-diphenyl methane diisocyanate and its polymers, and the like such toxicity problems are obviated. The preferred polyaryl alkylene polyisocyanate for use in the invention has the formula

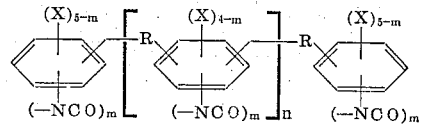

in which R is an organic radical and preferably an aliphatic radical obtained by removing the carbonyl oxygen from an aldehyde or ketone and is preferably $-CH_2-$, $m$ is 1 or 2, X is halogen, lower alkyl or hydrogen and $n$ is 0, 1, 2 or 3. The aliphatic radical, R, in the foregoing formula, may be obtained by removing the carbonyl oxygen from many suitable aldehyde or ketone such as, formaldehyde, acetaldehyde, propionaldehyde, butyraldehyde, N-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, $H_2C=O$, the radical remaining is a methylene radical or from acetone,

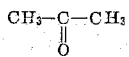

the radical remaining is

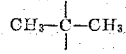

When X is halogen, it may be any suitable halogen but is preferably chlorine or bromine and further, it is preferred that the amount of chlorine or bromine fall between about one percent and fifteen percent by weight of the compound. When X is lower alkyl, it is most preferably methyl or ethyl but other lower alkyl radicals such as propyl, butyl and the like may be the radical, X. The polyaryl alkylene polyisocyanates of the invention are preferably mixtures of di- and higher polyisocyanates. Thus, $n$ in the formula preferably has a value of from about 0.1 to about 1.5. To illustrate, in a mixture of isocyanates of the above formula containing 90 percent diisocyanate and 10 percent triisocyanate, $n$ would have a value of 0.1. For a mixture containing 20 percent, di-, 30 percent tri-, 30 percent tetra- and 20 percent penta-isocyanate, the average value of $n$ would be 1.5. A most preferred value for $n$ is between about 0.85 and about 1.1 with about 40 percent to about 60 percent of the mixture of polyisocyanate being a diisocyanate.

Isocyanates of the above formula are well-known and available commercially. They may be prepared as disclosed in U.S. Patent 2,683,730. A specific isocyanate suitable for use in accordance with the present invention may be obtained by reacting about 60 parts of aniline with about 25 parts of formaldehyde (aqueous, 37 percent $CH_2O$) and about 74 parts of HCl (aqueous, 30 percent HCl) at a temperature of about 90° C. to about 100° C. for about 1.5 to about 2 hours and then reacting this product with NaOH and separating out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed.

The commercially available polyphenyl methane polyisocyanates are particularly adapted for use in the present invention and are most preferred. The best products have 40 percent to 60 percent 4,4'-diphenyl methane diisocyanate, an amine equivalent of about 125 to about 140, about 0.04 to about 0.4 percent by weight hydrolyzable chloride, about 0.1 to about 0.6 percent by weight total chloride and having a flash point of above about 400° F.

The invention contemplates the use of any suitable active hydrogen containing compound reactive with —NCO groups in the preparation of the polyurethane foam splint, and any suitable catalyst in conjunction with any suitable foam stabilizer such as those listed in U.S. Patent 3,095,386. However, the preferred foam formulation in the process of this invention is prepared from the polyphenylmethane polyisocyanates containing 40 to 60 percent of 4,4'-diphenylmethane diisocyanate, the condensation product of 1,1,3-tris-(hydroxyphenyl)propane and propylene oxide which has an hydroxyl number of about 380, a catalytic amount of 1-methyl-4-dimethyl aminoethyl piperazine, trichlorofluoromethane, or in other words, Freon-11, and a siloxane oxyalkylene block copolymer as a foam stabilizer. The preferred siloxane oxyalkylene block copolymer in the above formulation has the general structure

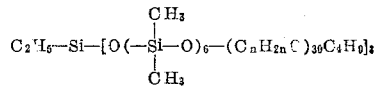

wherein $C_nH_{2n}O$ is a mixed polyoxyethylene and oxypropylene block copolymer containing about 17 oxyethylene units and about 13 oxypropylene units.

In a preferred embodiment of this invention, the patient's limb, or whichever area requires the splint, is lubricated with any suitable lubricant, such as a salve or grease or petroleum jelly, for example. The lubricant acts as a protection for the area to be supported and also insures that the splint can be removed with the maximum amount of expediency. The properties of the lubricant should be considered with particular reference to this use of the lubricant as a release agent for the foam splint.

After the application of the lubricant, the area to be supported is then wrapped in some suitable material such as cloth, paper or any suitable gauze material, for example. The components of the foam as enumerated above, are placed in the spraying mechanism to be used, such as the one described in U.S. Patent 3,073,533 or U.S. Patent 3,009,209, in which the materials are injected into a mixing head and mixed, and then sprayed onto the limb or body area which requires support. The liquid components thus sprayed are deposited on the gauze or similar material in which the area to be sprayed has been wrapped, and thus anchored, react to form a uniform foam splint.

In a modification of the spraying mechanism such as the one suggested in U.S. Patent 3,009,309, the spraying mechanism can be altered to move back and forth across an area, or the spraying nozzles can be formed into a ring for the purpose of effectively spraying a limb, and the splint may be applied in a plurality of thin layers until the desired thickness is achieved. The time involved before the splint is applied and effective is very short; the foam is sufficiently cured in a matter of minutes, and there is no discomfort to the patient. This splint, thus applied, is an excellent buffer and absorbs a tremendous amount of shock or impact without jarring the area which it is protecting.

The advantages of the application of the splint or cast by a spraying technique are of great significance, and the use of the preferred foam formulation given above presents immeasurable advantage in that the resulting foam has a density of about 4 to 10 lbs./ft.$^3$, making it light weight without forfeiting strength. Consequently, because of the high strength to density ratio of this foam, a splint may be applied in a thickness of only about one-fourth of an inch, in some instances, and in any case, a thickness of one inch need never be exceeded in order for the polyurethane foam to effectively perform the function for which it was intended.

The components of the foam are non-irritating to the skin, and therefore present no problem with adverse reaction to this formulation. Furthermore, since the isocyanate component has a vapor pressure of about $6 \times 10^{-5}$ mm. at 25° C. there is no danger of harm to either the patient or the operator due to toxicity of the reactants. As a consequence, the formulation may be sprayed without elaborate precautions. Indeed, whereas heretofore the application of a polyurethane foam splint by spraying had been precluded because of the toxicity of the polyisocyanate coupled with its high vapor pressure, the components of the formulation of this invention have a vapor pressure sufficiently low to permit ease of application with no danger to the patient or the operator. The vapors of the reactants which may enter the air during the application of the splint will not be harmful to any personnel, therefore, even if those personnel are engaged in thus applying splints as a routine duty.

Another one of the significant aspects of this foam, and perhaps the most significant aspect of this formulation, is that the reaction between the diisocyanate and the active hydrogen containing compound has a relatively low exotherm since there is no reaction with water involved, and since it has been ascertained that these components have a characteristically relatively low exotherm which is negated or reduced to insignificance by the vaporization of the blowing agent used, said blowing agent being trichlorofluoromethane.

Should it be so desired, the foam made from this formulation is easily ventilated without sacrificing its strength, merely by punching a hole in it with a pencil or some similar object. The splint needs no reinforcement and the foam can be sprayed in place as instantaneously as desired simply by adjusting the amount or type of catalyst used. The weathering aspects of this foam are phenomenal in that it stands up to every day wear and tear without losing its properties or becoming shabby in appearance.

In addition, this type of foam is flame resistant and since this would be a practical consideration in the practice of this invention, a distinct advantage over any other type of foam formulation which may be suggested is demonstrated. The splint may be rendered completely flameproof if desired, by the addition of small amounts of a flameproofing agent such as trichlorotriethylphosphite or some similar material.

The spraying technique for applying this foam allows the operator to spray as thin or as thick a splint as the situation may require, keeping in mind the high strength to density ratio of this foam. In addition, the spraying puts an even layer of the rigid foam on the area being sprayed leaving a smooth surface on the splint once it has been applied, without having to use some other means to accomplish this result. A low capacity spray mechanism such as a spraying gun would also allow the operator to spray localized areas without overspraying, and the splint or cast can thus be easily applied without requiring a high degree of skill. Additionally, the mechanism for so applying the foam splint is easily moved and the advantages which accrue from the portability of the equipment make complete the ideal method and formulation for applying a splint which is capable of fulfilling all the functions for which it was intended with none of the disadvantages of those splints which have been used formerly.

This invention is further illustrated, but not limited by the following example in which the parts are by weight.

*Example*

With reference to the drawings in which one embodiment of this invention is illustrated in FIGURE 1, the arm to be supported is lubricated with petroleum jelly or some similar substance 1, and thereafter wrapped with a gauze cloth 2.

Figure 2:
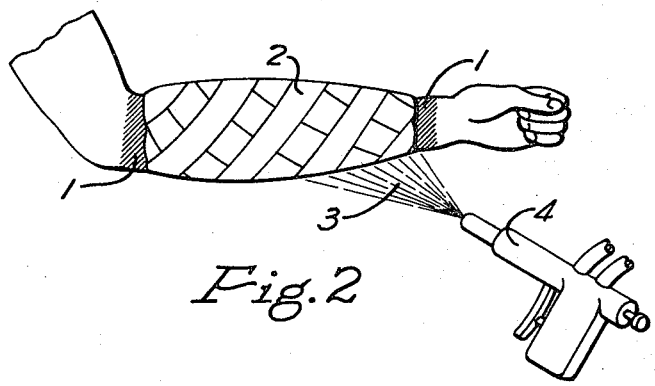
FIGURE 2 illustrates one method of applying a foam formulation in liquid form from a spray gun to the gauze-wrapped arm, which liquid then foams resulting in a rigid support.

Referring now to FIGURE 2 of the accompanying drawing, about 90 parts of a polyphenylmethane polyisocyanate containing about 45 percent of 4,4'-diphenylmethane diisocyanate, about 100 parts of the condensation product of 1,1,3-tris-(hydroxyphenyl)-propane which has a hydroxyl number of about 380, about 25 parts of trichlorofluoromethane, about 1 part of 1-methyl-4-dimethylaminoethyl piperazine, and about 1 part of an alkyl siloxane oxyalkylene block copolymer having the formula

Figure 3:
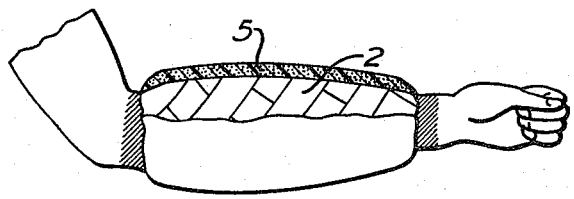
FIGURE 3 is a cross-sectional view of the finished splint in place on the patient's forearm.

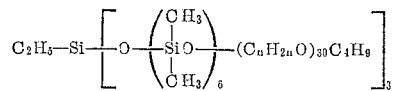

wherein ($C_nH_{2n}O$) represents about 17 oxyethylene units and about 13 oxypropylene units, are introduced into a machine or spray gun 4, such as the ones described in U.S. Patent 3,073,533 or U.S. Patent 3,009,209. The components are then mixed by the apparatus 4, and sprayed as a liquid 3, onto the area requiring a splint which has been previously coated with a lubricant 1, and subsequently wrapped with a gauze cloth 2. The liquid components are deposited on the gauze, and thus anchored, react and expand to form a uniform foam splint having a thickness of about one inch as illustrated in cross-section in FIGURE 3, in which the cloth gauze 2 is shown anchoring the finished splint 5. FIGURE 3 shows the splint after the completion of the foaming process, which requires only a few minutes, and indicates that the splint conforms substantially to the contours of the limb and is thus ready to perform the function for which it was intended.

Although certain representative embodiments and details have been shown for the purpose of illustrating this invention, it will be apparent to those skilled in the art that various changes and modifications may be made therein without departing from the spirit and scope of the invention.

What is claimed is:

A method for applying a splint to an area for the support thereof which comprises spraying a polyurethane foam formulation on the area to be supported, the formulation being comprised of a polyphenylmethane polyisocyanate containing about 40 to about 60 percent of 4,4'-diphenylmethane diisocyanate, the condensation product of 1,1,3-hydroxyphenyl propane with propylene oxide having a hydroxyl number of about 380, 1-methyl-4-dimethyl aminoethyl piperazine, trichlorofluoromethane and a siloxane oxyalkylene block copolymer.

References Cited by the Examiner

UNITED STATES PATENTS

| | | | |
|---|---|---|---|
| 2,577,279 | 12/1951 | Simon et al. | 128—90 |
| 2,650,212 | 8/1958 | Windemuth | 260—75 |
| 2,947,307 | 8/1960 | Hoppe | 128—90 |
| 3,090,694 | 5/1963 | Pereny et al. | 106—177 |
| 3,133,853 | 5/1964 | Knox | 161—119 |

ROBERT E. MORGAN, *Acting Primary Examiner.*

RICHARD A. GAUDET, *Examiner.*

J. W. HINEY, JR., *Assistant Examiner.*